July 15, 1969 C. B. PEAR, JR 3,456,249

READOUT SYSTEM FOR MAGNETIC RECORDS WITH VARIATIONS OF SPACING BETWEEN HEAD AND RECORD

Filed March 5, 1965 2 Sheets-Sheet 1

INVENTOR
CHARLES B. PEAR, Jr.

BY Hurwitz & Rose

ATTORNEYS

INVENTOR
CHARLES B. PEAR, Jr.

BY Hurvitz & Rose
ATTORNEYS

United States Patent Office 3,456,249
Patented July 15, 1969

3,456,249
READOUT SYSTEM FOR MAGNETIC RECORDS WITH VARIATIONS OF SPACING BETWEEN HEAD AND RECORD

Charles B. Pear, Jr., Eau Gallie, Fla., assignor to Radiation Incorporated, Melbourne, Fla., a corporation of Florida Filed Mar. 5, 1965, Ser. No. 437,379
Int. Cl. G11b *5/00;* G01d *15/06, 15/08*
U.S. Cl. 340—174.1 9 Claims

ABSTRACT OF THE DISCLOSURE

A system for deriving information from signals magnetically recorded on a magnetic tape includes an electromagnetic sensor disposed adjacent the tape surface for detecting the recorded signals and translating them to representative electrical signals as the tape is longitudinally displaced relative to the sensor. To improve sensitivity, the tape is also moved perpendicularly to its longitudinal dimension to vary the gap between the sensor and the tape at a speed much greater than the longitudinal displacement. The output signals obtained from the sensor are sampled at a rate much faster than the rate of variation of the gap.

The present invention relates generally to displacement transducers and more particularly to magnetic displacement transducers wherein information signals are derived from the relative motion between a signal-bearing magnetic medium and a sensing device.

In magnetic displacement transducers of the type contemplated herein, information is recorded in the form of a positional code along one or more tracks on a magnetic medium, such as a tape, strip, belt, drum, disk, or other conventional configuration, by any of the well known "writing" techniques. The code-recorded medium is hereinafter referred to as a magnetic record. In a typical arrangement, the magnetic record is displaced in a plane parallel to its surface relative to one or more sensing heads disposed adjacent the track or tracks thereof. Alternatively, the sensing head may be displaced for scanning the stationary magnetic record. In either event, information is conveyed to a local or remote station, such as a computer, as the position of the recorded signals, e.g. stored code bits, is displaced relative to an arbitrary datum point to vary the flux lines passing through each head.

In previously proposed displacement transducers, certain difficulties have been encountered in, for example, obtaining accurate information from the transducer; limiting the quantity of information derived and conveyed to that which is essential to the task to be performed; balancing economic considerations, such as conservation of power, for efficient performance against operational requirements; obtaining flux-responsive readout under rapid pulse operation; and deriving adequate signal output levels.

It is, accordingly, an object of the present invention to overcome one or more of the above-mentioned difficulties encountered in prior art displacement transducers.

In accordance with the present invention, as or after the magnetic record undergoes longitudinal displacement, it is actuated, on command, for motion substantially normal to its surface, i.e. perpendicular to the usual plane in which it is moved. The interval during which this perpendicular motion is effected is of extremely short duration relative to the speed of longitudinal displacement so that there is essentially zero displacement of the record during each such interval. At the same time that the perpendicular motion is actuated, means are energized to effect rapid sampling of the sensing head output voltage during the period at which it is at or near its peak amplitude. Thus, despite limitations on the speed at which the perpendicular motion occurs, the output signals are substantially unaffected, i.e. not modulated, by the mechanical frequency of perpendicular motion of the magnetic record. The amplitude or level of output signals is a function of flux intensity passing through the head, which is in turn governed by the storage density of recorded signals, or bit wavelength. Therefore, the maximum separation between magnetic record and head is determined by the bit wavelength.

By virtue of operation in accordance with provisions of the present invention, output signal level is increased, rapid pulse readout is possible utilizing a group of sensing heads, resolution capability is improved, power is conserved, and readout is controllably limited to any desired portion or portions of the recorded signals to permit for example, multiplexing the outputs derived from several tracks or records.

It is therefore a further object of the persent invention to provide perpendicular as well as longitudinal motion between the magnetic record and sensing heads of a displacement transducer in conjunction with controlled sampling of signals for attainment of the above-mentioned advantages.

It is still another object of the present invention to synchronize in a magnetic displacement transducer, the sampling of one or more sensing head output voltages with the attainment of peak amplitudes thereof upon controlled variation in the spacing or gap between magnetic record and sensing heads.

These and still further objects, features and attendant advantages of the present invention will become apparent from a consideration of the following detailed description of one specific embodiment thereof, especially when taken in conjunction with the accompanying drawings in which.

Figure 3A:
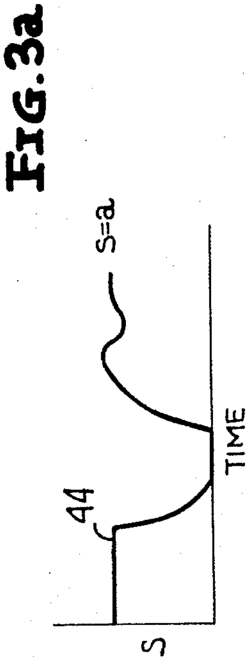
Figure 3B:
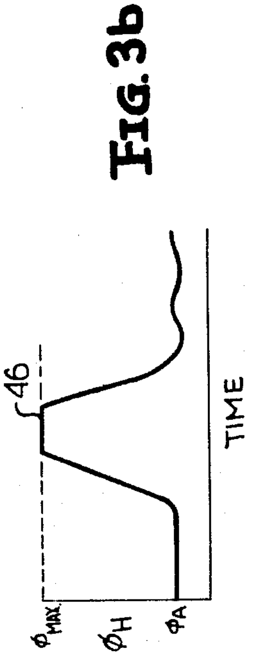
Figure 3C:
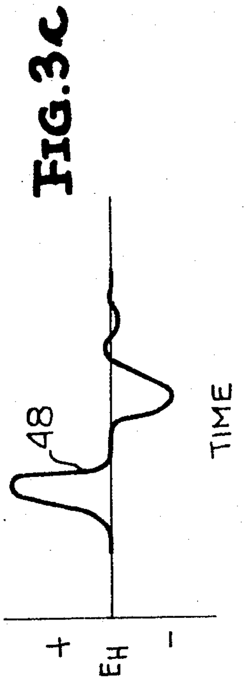
Figure 1:
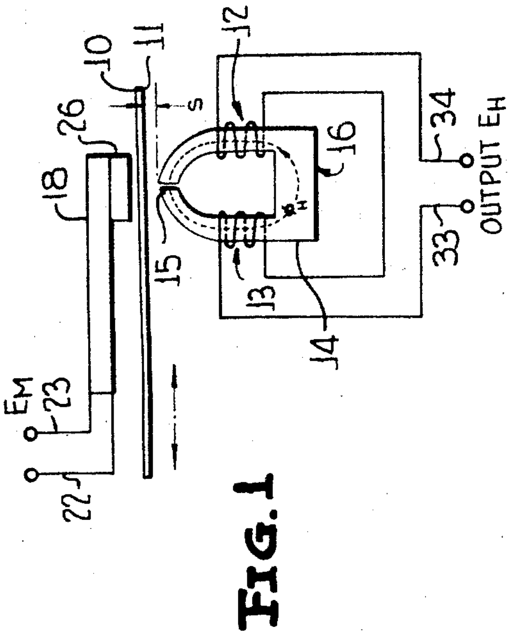
FIGURE 1 is a side view, partially in schematic form of a displacement transducer in accordance with the present invention.
Figure 4:
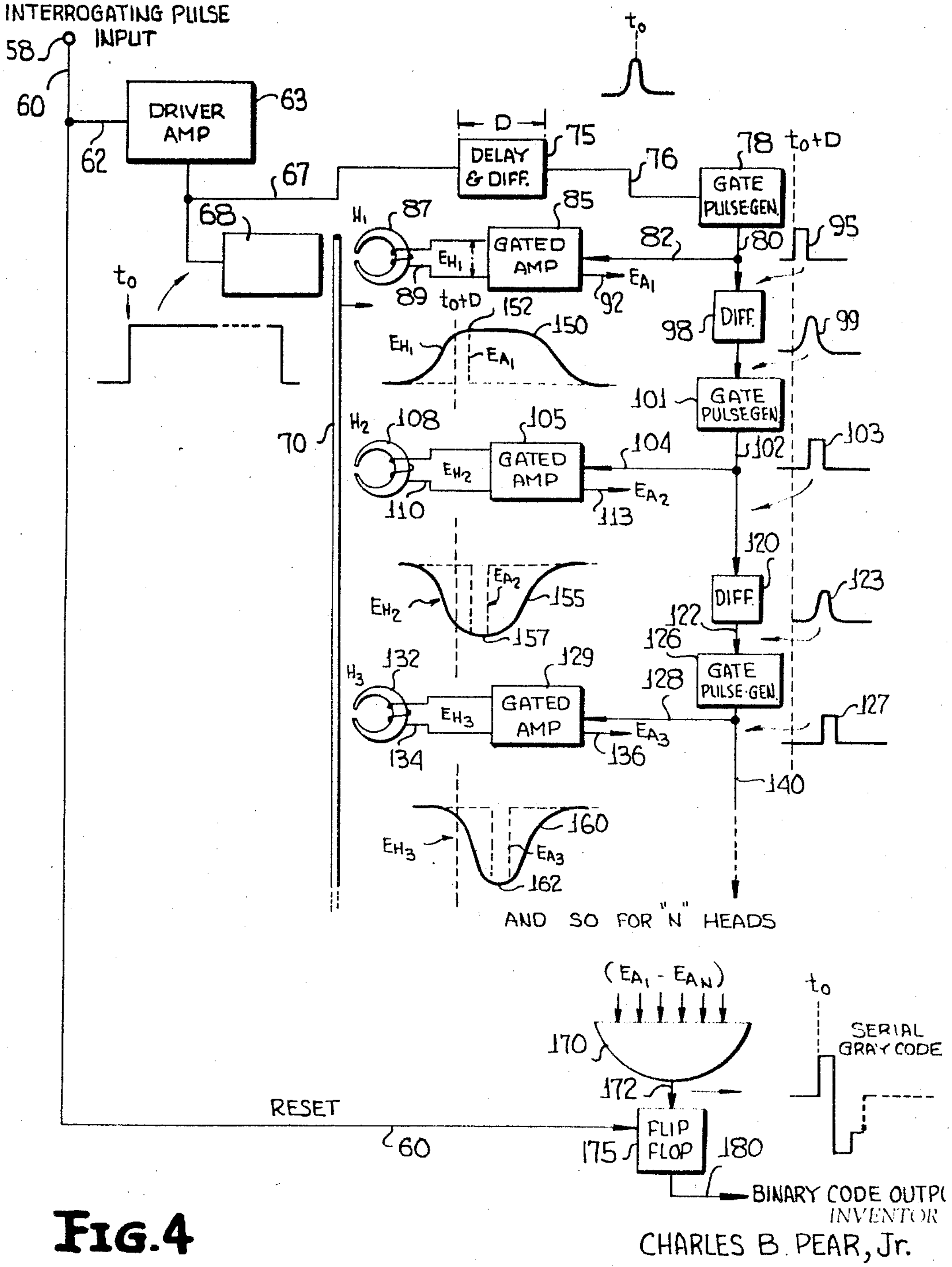

FIGURES 3(*a*), (*b*) and (*c*) are waveforms illustrating the time relationship between various physical and electrical parameters during operation of the transducer of FIGURE 1;

FIGURE 4 is a partially schematic and partially block diagrammatic illustration of a coding system in accordance with the present invention.

Referring now generally to the drawings, and more specifically to FIGURE 1, a displacement transducer in accordance with the present invention includes a magnetic record such as a thin strip 10 of nonmagnetic material having a magntic coating 11 on a surface thereof adjacent and in relative close proximity to the magnetic core 14 of a readout or sensing head, generally designated as 16. The strip 10 is movable in either direction longitudinally parallel to its surface in response to driving actuation by means (not shown) whose relative displacements are to be sensed by the transducer. It will, of course, be understood that the recorded medium may alternatively be a moveable tape, drum, or may have other suitable surface geometry on which the appropriate code pattern has been recorded. In addition, it should be noted that the sensing head may be the movable element and the recorded medium the fixed element if desired. The recorded code pattern will generally comprise bits of information which have previously been suitably "written" on the magnetic surface, as by a recording head, and which identify the displacement location of the medium with respect to the sensing head.

The core 14 of magnetic sensing head 16 may be fabricated of any conventional soft magnetic material or materials and has provided therein a gap 15 at one point in the ring by the extension of the two arms or branches of the core. Detecting coils 12 and 13 are wound about each of the branches of the core and are formed from a single electrical conductor wound such that each coil series aids the other in detection or rate of change of flux in the core. The ends of the single conductor terminate at electrical terminals 33 and 34 across which will appear the induced output voltage representative of the time rate of change of flux in the core.

In order to vary the separation or gap between strip 10 and magnetic head 16 and thus to vary the rate of change of flux in the core as strip 10 is displaced in one direction or the other perpendicular to its surface, means are provided for vibrating the recorded strip. One such means suitable for exciting or modulating the motion of strip 10 includes a crystal bimorph 18 which is excited by a source of electrical energy (not shown) connected to terminals 22 and 23.

When the electrical source is energized the bimorph vibrates in accordance with the character of the exciting waveform as will be readily understood with reference to the theory of piezo-electricity. The crystal is coupled to the recorded medium via a pad 26 in such manner as to transmit these vibrations to the strip and consequently to vary the separation between strip and core without limiting the longitudinal displacement of the strip. The bimorph may be supported in any known manner to fix its position relative to the strip in the absence of excitation. It will, of course, be understood that control of variation and physical separation between medium and head may be provided by any of a variety of conventional means, but the use of a magnetic device should be avoided since the magnetic field produced thereby would tend to create an interfering flux in the sensing head and would, therefore, necessitate isolating the core structure in a suitable manner.

In the operation of the transducer arrangement of FIGURE 1, the crystal bimorph 18 is excited by an energizing source when it is desired to obtain a readout from the magnetic sensing head. Thus, the physical separation or gap between head and magnetic record may be controlled during and/or after the strip is displaced, to produce a change in flux within the core and thus to induce an output voltage in the windings disposed thereon. This induced flux will be governed to a great extent in accordance with the character of the portion of recorded code pattern at which sensing occurs. Bimorph 18 may be continuously excited by an alternating waveform to produce a continuous sinusoidal vibration of strip 10 or may be driven by pulse interrogation when a readout is desired. The use of infrequent pulsing for driving the magnetic record is desirable where it may be necessary to conserve power, and these pulses should be of extremely short time duration relative to the longitudinal motion of the strip to insure that there is essentially zero displacement between medium and the head during each modulated pulse.

The maximum and minimum limits of gap between medium and sensing head and hence the output level of the iuduced voltage will be determined from the wavelength or bit density of the recorded code pattern. As will hereinafter be more fully explained, the output level varies inversely as the wavelength or bit density of the recorded code pattern, in accordance with the separation equation.

Figure 2:
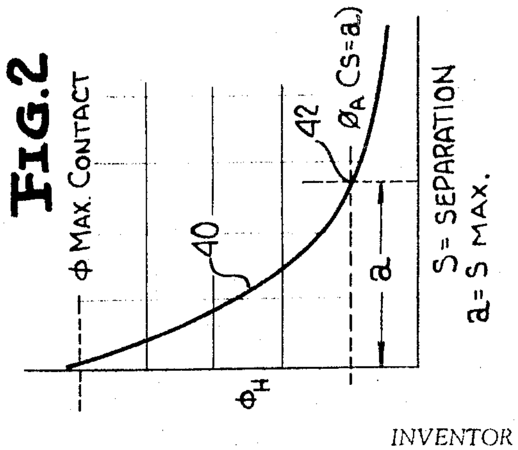
FIGURE 2 is a graphic illustration of the flux variation in the sensing head in response to the relative separation between the head and the recorded medium.

Referring now to FIGURE 2, curve 40 represents the flux passing through core 14 of sensing head 16 versus the separation between recorded medium and sensing head. Between points at which the separation $s$ is equal to zero, i.e. at contact between record and core, and at which $s=a$, where $a$ is the maximum allowable separation, the flux intensity $\phi_H$ decreases exponentially from a maximum of $\phi_M$ at contact to the value $\phi_A$ (at point 42).

FIGURES 3($a$), ($b$) and ($c$) illustrate more clearly the temporal relationship between physical and electrical parameters in the transducer as a driving pulse is applied to crystal bimorph 18 to produce a pulsed separation between medium 10 and sensing head 16. In FIGURE 3($a$) the medium is displaced from a maximum separation or gap ($s=a$) to a point of direct contact ($s=o$) between medium and core, and subsequently back to its original point of separation as illustrated by waveform 44. It will be understood that the gap limits need not be those shown in FIGURE 3($a$); for example, direct contact need not be effected. The variation of the separation or spacing produces a corresponding variation 46 in flux intensity in the core as illustrated in FIGURE 3($b$). At $s=a$ the flux intensity is $\phi_A$ (see also FIGURE 2), and as the medium approaches the head the flux level increases rapidly, attaining at contact ($s=o$) a value $\phi_M$. As the separation is again increased to the value $a$ the flux passing through the head diminishes in intensity to $\phi_A$. Referring to FIGURE 3($c$), during the pulse excitation the output voltage $E_H$ induced in the core winding is, of course, $d\phi_h/dt$. Hence a positive pulse 48 occurs during the time interval of increasing flux lines threading the core and a negative pulse during the time interval of decreasing flux. The positive pulse (negative pulse in the event of opposite flux directions) may be sampled during the interval at which it is at or near its maximum amplitude to provide information relating to the displaced position of the record as will be more fully explained in the description of FIGURE 4.

The output voltage level is a function of the density of stored bits, i.e. the wavelength of the recorded code pattern, as is the flux intensity through the head, in accordance with the separation equation $$\phi_H \text{ (in db)} = KS/\lambda \quad (1)$$

where

S=separation between head and medium,
$\lambda$=wavelength, and
K=constant.

The varition in flux is, therefore, $$\phi_A/\phi_M = \exp\ (K_1 S/\lambda) \quad (2)$$

where $K_1$ is a negative constant, assuming a sinusoidal variation in flux along the medium. Thus the longest recorded bits would determine the greatest separation required.

Although the mechanical motion does not occur rapidly enough to permit extremely rapid readout pulses, an output gate may be provided so that all of a group of heads may be sampled by a series of microsecond pulses, for example, in sequence during the relatively longer period of transverse motion, in a synchronized manner. To this end a gating and readout system, illustrated in exemplary embodiment in FIGURE 4, is provided. Conductive lead 60 is connected between an input terminal 58 and flip-flop circuit 175. The input of driver amplifier 63 is also connected to input terminal 58 via lead 62, and the output to an actuator device 68 and to delay and differentiator circuit 75. Actuator 68, such as of the form illustrated in FIG. 1, is employed to drive the recorded strip 70 perpendicularly to the surface thereof, and is common to all points along the track or tracks at which a sensing head (for example 87, 108, 132, etc.) is disposed. Strip 70 is arranged to be driven in longitudinal movement parallel to the recorded surface or tracks thereof by appropriate means (not shown) and in perpendicular motion under the control of common actuator 68. Each of the plurality of sensing heads is positioned adjacent each recorded track for detecting and identifying the relative displacement location of the medium by the induced coded output voltage. The output of delay and differentiator circuit 75 is coupled to gate pulse generator 78 via conductor 76. The delayed pulse output of generator 78 is applied via parallel paths 80 and 82 respectively to differentiator 98 and to gated amplifier 85, the latter being effective when energized to permit passage of the output signal of head 87 during the period in which the induced output voltage on windings 89 is at or near its peak amplitude. This is illustrated by waveform 150, the sampled portion occurring at 152. This signal sample is conveyed by a conductive path from the output of gated amplifier 85 to an input terminal of OR gate 170.

Each of the succeeding sensing heads similarly has associated therewith a differentiator circuit, gate pulse generator and gated amplifier, such as 98, 101, and 105, respectively, associated with sensing head 108; 120, 126 and 129, respectively, associated with sensing head 132; and so forth. The interrogating pulses applied at input terminal 58, is, after initial differentiation by circuit 75, sequentially differentiated and applied to the respective gate pulse generator circuits associated with each sensing head to sample the resepective output voltage thereof in the same manner as has been described with respect to sensing head 87.

Each of the voltage sample outputs is applied to a separate input terminal of OR gate 170, the output of which provides a serial code of the information embodied in the recorded code pattern of the displaced tracks.

The flux lines passing through each separate sensing head may be either positive, negative or zero in accordance with the recorded code pattern of the medium. Thus the induced output voltage $E_H$ may be either positive, negative or intermediate as indicated by wave forms 150, 155, and so forth, and the amplitude of each will vary depending in part upon the bit density of the respective track or tracks.

In operation of the exemplary system of FIGURE 4, an interrogating pulse is applied to terminal 58 by a suitable excitation source (not shown). Driver amplifier 68 produces an amplified pulse in response thereto to energize common actuator 68 and thus to drive medium 70 toward the heads in accordance with the character of the pulse. Differentiator circuit 75 also responds to the amplified pulse output of driver amplifier 68 to provide an output pulse after suitable delay to allow the voltage induced in each sensing head winding to approach its peak amplitude. The delay will be that appropriate for the rate of change of gap, and, hence, of flux, to approach its maximum value. The delayed pulse will, in turn, be delayed and differentiated at each sampling circuit associated with a particular sensing head in a sequential manner as illustrated by waveforms 95, 99, 103, 123, 127 and so forth, so that a series of voltage samples is generated. Each voltage sample is, therefore, applied sequentially to a respective input terminal of OR gate 170 to provide a bit of a serial output code word. since the code pattern is best recorded on the magnetic medium using Gray (reflected binary) or some similar unit distance code, the serial code generated at the output of OR gate 170 will also be of this type. The output code may be converted to a serial binary code, for example, by conventional means such as flip-flop 175, for transmission and processing at local or remote stations. A reset pulse is applied to flip-flop 175 at the beginning of each sampling period via the input terminal at which interrogating pulses are applied; that is each interrogating pulse triggers the code converter to a reset state or condition.

It is necessary in the operation of the circuit of FIGURE 4 that each interrogating pulse be of short duration relative to the speed of longitudinal motion of the magnetic record so that there is essentially zero displacement during each pulse. The sampling pulses, which are purely electrical in nature rather than mechanical, are of much shorter duration than the interrogating pulse, and of rapid sequence so that a plurality of sampling pulses may be triggered during a single interrogating pulse interval. In the circuit of FIGURE 4, each gating or sampling pulse begins at the time the immediately preceding pulse terminates. Therefore, each sensing head output voltage is sampled in sequence and at a rate which is sufficiently rapid to include N samples within the duration of the mechanically actuated pulse, where N is the number of bits in each code word. Thus each output sample or bit is substantially independent of the frequency of occurrence of the mechanical pulses and hence is not modulated appreciably thereby. Rather, each sample is a function of the time rate of change of flux produced by the recorded signal.

It will further be seen that the aforementioned advantages are obtained by the use of displacement transducers and associated sampling in accordance with the present invention. However, while certain specific embodiments have been shown and described, it will be apparent that various changes and modifications may be resorted to without departing from the true spirit and scope of the invention as defined in the appended claims.

I claim:

1. In a system for deriving information from signals magnetically recorded in a coded pattern on a surface of a movable magnetic medium, electromagnetic sensing means disposed adjacent said surface, means for displacing said medium and said sensing means relative to each other in a direction parallel to said surface of said medium to vary the position of said recorded signals relative to said sensing means, means for selectively varying the gap between said surface and said sensing means during said relative displacement at a speed much greater than said relative displacement to permit detection of said recorded signals by said sensing means and translation thereof to representative electrical signals, and means for sampling said electrical signals during selected portions of an interval in which said gap is varied from an initial separation between said medium and said sensing means back to said initial separation, each of said sampling portions of said interval having a duration much less than the duration of the overall interval.

2. In a magnetic displacement transducer for deriving information from signals recorded in a coded pattern on a surface of a movable magnetic medium, electromagnetic sensing means disposed adjacent said surface, means for displacing said medium and said sensing means relative to each other in a direction parallel to said surface of said medium to vary the position of said recorded signals relative to said sensing means, means for selectively varying the gap between said surface and said sensing means at a rate much greater than said displacement to permit detection of said recorded signals by said sensing means and translation thereof to representative electrical signals, and means for sampling said electrical signals during a predetermined portion of the interval in which said gap is varied; wherein said means for selectively varying the gap between said surface and said sensing means includes piezoelectric transducer means coupled to said medium and responsive to excitation signals to move said medium between predetermined maximum and minimum limits in a direction substantially perpendicular to said surface; and wherein said electromagnetic sensing means includes a magnetic core having a winding disposed thereon for generating electrical signals in response to variations in flux circulating said core; and wherein said sampling means includes means responsive to said excitation signals for gating said electrical signals from said electromagnetic sensing means, and means for delaying the application of said excitation signals to said gating means to permit said electrical signals to reach maximum amplitude.

3. In a magneic displacement tranducer for deriving information from signals magnetically recorded in a coded pattern on a surface of a movable magnetic medium, electromagnetic sensing means disposed adjacent said surface, means for selectively varying the gap between said surface and said sensing means to permit detection of said recorded signals by said sensing means and translation thereof to representative electrical signals, means for displacing said medium and said sensing means relative to each other to vary the position of said recorded signals relative to said sensing means, and means for sampling said electrical signals during a predetermined portion of the interval in which said gap is varied; wherein said code signals are recorded in a plurality of tracks along said surface, said means for displacing being coupled to said medium to produce movement of said medium in the longitudinal direction of said tracks; and wherein said electromagnetic sensing means includes a plurality of pick-up heads, each of said heads being disposed adjacent a respective one of said tracks; said gap varying means being responsive to the application thereto of an excitation signal to simultaneously vary the gap between said medium and each of said pick-up heads; load circuit means; and wherein said sampling means includes means responsive to said excitation signals for sequentially gating said electrical signals from each of said pick-up heads to said load circuit means.

4. A pulse code generator for transmitting signals derived from the recorded code pattern tracks along the surface of a magnetic record, said generator including a plurality of electromagnetic sensing means disposed adjacent respective ones of said tracks for detecting variations in the recorded code pattern upon relative motion therebetween and for generating signals representative thereof, means for producing relative motion between said magnetic record and said plurality of electromagnetic sensing means in a direction parallel to said surface, means responsive to an excitation signal for selectively varying the position of said magnetic record relative to said plurality of electromagnetic sensing means between predetermined maximum and minimum limits in a direction substantially perpendicular to said surface, and gating means further responsive to said excitation signal for sequentially sampling said signals generated by said plurality of electromagnetic sensing means and for suppressing said generated signals in the absence of an excitation signal.

5. The invention according to claim 1 wherein said gap between said sensing means and said medium is continuously varied in cyclical fashion.

6. The invention according to claim 1 wherein said gap between said sensing means and said medium is varied for only discrete separated ones of said intervals in pulsed fashion.

7. A system for reading information recorded on a magnetic tape comprising;

means positioned adjacent the tape for sensing said recorded information as said tape is longitudinally displaced relative thereto, and for translating said information to representative electrical signals, means for varying the distance between said tape and said sensing means normal to the path of said longitudinal displacement, at a rate much greater than that of said longitudinal displacement, and means for selectively sampling said electrical signals, for readout thereof, at a rate much greater than that of said variation of distance between said sensing means and said tape.

8. The system according to claim 7 wherein said variation of distance is cyclical.

9. The system according to claim 7 wherein said variation of distance is selectively produced at discrete intervals.

References Cited

UNITED STATES PATENTS

| | | | |
|---|---|---|---|
| 2,681,387 | 6/1954 | Roys | 179—100.2 |
| 3,270,328 | 8/1966 | McCreary | 179—100.2 |
| 3,333,275 | 7/1967 | Guerth | 340—174.1 |

FOREIGN PATENTS

| | | |
|---|---|---|
| 850,963 | 10/1960 | Great Britain. |

BERNARD KONICK, Primary Examiner

VINCENT P. CANNEY, Assistant Examiner

U.S. Cl. X.R.

179—100.2; 346—74